United States Patent [19]
Watkinson et al.

[11] 3,879,315
[45] Apr. 22, 1975

[54] PROCESS FOR THE PREPARATION OF FLEXIBLE POLYURETHANE FOAMS IN THE PRESENCE OF ALKYL ALKANOATE BLOWING AGENTS

[75] Inventors: John Watkinson, Shrub Oak, N.Y.; Ralph R. Elrich, Stamford, Conn.

[73] Assignee: Union Carbide Corporation, New York, N.Y.

[22] Filed: June 18, 1973

[21] Appl. No.: 370,850

[52] U.S. Cl. .................. 260/2.5 AF; 260/2.5 AE
[51] Int. Cl. .................. C08g 22/44; C08g 53/10
[58] Field of Search ............... 260/2.5 AF, 2.5 AE

[56] References Cited
UNITED STATES PATENTS
3,072,582   1/1963   Frost .................................. 260/2.5
3,745,203   7/1973   Harper ............................... 260/2.5

OTHER PUBLICATIONS

Journal of Cellular Plastics, May/June, 1972, pp. 144–155, Soukup et al.
Journal of Cellular Plastics, June, 1968, pp. 216–220, Boucher et al.

*Primary Examiner*—Eugene C. Rzucidlo
*Attorney, Agent, or Firm*—Eugene C. Trautlein

[57] ABSTRACT

This application relates to the use of alkyl alkanoates having molecular weights no greater than 74 as blowing agents in the production of flexible slabstock polyurethane foams. Compared to the blowing agents (fluorocarbons) widely used commercially in producing such foams, the alkyl alkanoates are more efficient in that they produce a greater volume of gas per pound of blowing agent.

10 Claims, No Drawings

PROCESS FOR THE PREPARATION OF FLEXIBLE POLYURETHANE FOAMS IN THE PRESENCE OF ALKYL ALKANOATE BLOWING AGENTS

BACKGROUND OF THE INVENTION

In the commercial production of polyurethane flexible slabstock foams, at least a portion of the gaseous phase of the foam is provided by fluorocarbon blowing agents. Such blowing agents are employed in fairly substantial amounts (e.g., in amounts up to about 30 parts by weight per 100 parts by weight of the polyol component used to produce the foam) and are fairly expensive materials. Accordingly, it is desirable to provide blowing agents for flexible slabstock polyurethanes that can be employed in smaller amounts than fluorocarbon blowing agents, and yet provide the same volume of gas, and that are less expensive than fluorocarbon blowing agents.

It is an object of this invention to provide a process for producing flexible slabstock polyurethane foams wherein the blowing agent provides a greater amount of gas, on a pound for pound basis, than is provided by commercially used fluorocarbon blowing agents.

It is another object of this invention to provide a process for producing flexible slabstock polyurethane foams wherein the blowing agent is less expensive, on a pound for pound basis, than commercially used fluorocarbon blowing agents.

Other objects of this invention will become apparent from the description thereof appearing below.

SUMMARY OF THE INVENTION

This invention provides a process for producing flexible slabstock polyurethane foams which comprises reacting and foaming, at atmospheric pressure, a reaction mixture comprising:

a. a polyether or polyester polyol component having a hydroxyl number from 28 to 150,
b. an organic polyisocyanate component,
c. a catalyst component for the reaction of (a) and (b) to form the polyurethane,
d. a polyurethane foam stabilizer component, and
e. a blowing agent component containing an alkyl alkanoate having a molecular weight no greater than 74.

In a preferred embodiment, the blowing agent component employed in the process of this invention comprises both the alkyl alkanoate and a conventional fluorocarbon blowing agent. That is, the blowing agent component comprises from 5 to 50 parts by weight of the alkyl alkanoate and from 95 to 50 parts by weight of a fluorocarbon having a molecular weight from 87 to 187 per 100 parts of weight of the alkanoate and the fluorocarbon. In a particularly preferred embodiment of this invention, the blowing agent component is an azeotrope composed of 18 parts by weight methyl formate and 82 parts by weight trichloromonofluoromethane per 100 parts by weight of the methyl formate and trichloromonofluoromethane.

The polyether polyols that can be employed in the process of the present invention include the poly(oxyalkylene) polyols, which are alkylene oxide adducts of water or a polyhydric organic compound as the initiator or starter. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethylolethane; 1,1,1-trimethylolpropane; and lower alkylene oxide adducts of any of the aforesaid initiators.

The polyester polyols that can be employed in the process of the present invention are the reaction products of polyfunctional organic carboxylic acids and polyhydric alcohols. The polyester polyols contain at least two hydroxyl groups per molecule (as alcoholic OH or as OH is COOH groups). The functionality of these acids is preferably provided by carboxy groups (COOH) or by both carboxy groups and alcoholic hydroxyl groups. Polyfunctional organic carboxylic acids that can be employed in producing polyester polyols useful in this invention include dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols. The polyhydric alcohols that can be employed in producing the polyester polyols useful in this invention include the monomeric polyhydric alcohols such as, for example: glycerol; 1,2,6-hexanetriol; ethylene glycol; diethylene glycol; trimethylolpropane; trimethylolethane; pentaerythritol; propylene glycol; 1,2-, 1,3- and 1,4-butylene glycols; 1,5-pentanediol; and the like, including mixtures thereof.

The hydroxyl number of the polyol component, including mixtures of polyols, employed in the production of the flexible polyurethane foams of this invention may vary over a relatively wide range such as from about 28 to about 150, and is usually no higher than about 80. The hydroxyl number of a polyol is determined by, and is defined as, the number of milligrams of potassium hydroxide required for the complete neutralization of the hydrolysis product of the fully acetylated derivative prepared from 1 gram of the polyol. The hydroxyl number is also defined by the following equation which indicates its relationship with the molecular weight and functionality of the polyol:

$$OH = 56.1 \times 1000 \times f/M.W.$$

wherein
OH = hydroxyl number of the polyol,
f = average functionality, that is, the average number of hydroxyl groups per molecule of polyol, and
M.W. = average molecular weight of the polyol.

The organic polyisocyanates employed in the process of the present invention include those represented by the general formula:

wherein: $i$ has an average value of at least 2 and is usually no more than 6, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof; 1,6-hexamethylene diisocyanate, 1,4-tetramethylene diisocyanate, bis(4-isocyanatophenyl)methane, phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate, 2,4-tolylene diisocyanate, 2,6-tolylene diisocyanate and crude tolylene diisocyanates. Also useful are polymeric polyisocyanates having the formula:

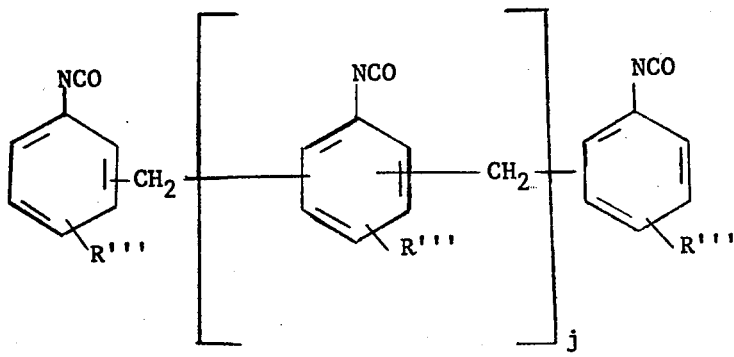

wherein R''' is hydrogen and/or lower alkyl and j has an average value of at least 0.1. Preferably the lower alkyl radical is methyl and j has an average value of from 0.1 to about 1.0. Polyphenylmethylene polyisocyanates of this type are available commercially under such trade names as PAPI, NIAX Isocyanate AFPI, Mondur MR, Isonate 390P, NCO–120, Thanate P–220, NCO–10 and NCO–20.

In general, the polyisocyanate and polyol components are employed in relative amounts such that the ratio of total -NCO equivalents to total active hydrogen equivalent (of the polyether polyol and any water, when used) is from 0.8 to 1.5, preferably from 0.9 to 1.1, equivalents of -NCO per equivalent of active hydrogen. This ratio is known as the Isocyanate Index and is often also expressed as a per cent of the stoichiometric amount of polyisocyanate required to react with total active hydrogen. When expressed as a per cent, the Isocyanate Index may be from 80 to 150, and is preferably within the range from about 90 to about 110.

The polyurethane-forming reaction is effected in the presence of a minor amount of a catalyst component. This component of the reaction mixture usually contains a tertiary amine. Suitable amine catalysts include one or more of the following: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.g., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol"). The amine catalyst is present in the reaction mixture in an amount of from about 0.05 to about 3 parts by weight of the catalyst per 100 parts by weight of the polyol component.

In producing polyurethanes from polyether polyols in accordance with the process of the present invention, a minor amount of certain metal catalysts can be included in the catalyst component. Useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal catalysts which can be present in the reaction mixture is within the range from about 0.05 to about 2 parts by weight per 100 parts by weight of the polyol component.

Polyurethane foam stabilizers are employed in the process of the present invention. Such foam stabilizers include various stabilizers known in the art. In the case of polyester polyurethane foams, such stabilizers can be organic surfactants or organosilicon surfactants while in the case of polyether polyurethane foams organosilicon surfactants are employed. Suitable organosilicon surfactants are siloxane-polyoxyalkylene block copolymers. As is known in the art, the particular composition of the block copolymer will depend upon the type of polyurethane foam being produced (i.e., polyester or polyether or rigid or flexible). The organosilicon surfactants are often employed along with organic surfactants and/or dissolved in a diluent such as a polyether. Suitable surfactants are disclosed in U.S. Pat. No. 3,594,334 and U.S. Reissue Pat. No. 27,541.

The blowing agent component employed in the process of the present invention contains an alkyl alkanoate having a molecular weight no greater than 74 (methyl formate, ethyl formate or methyl acetate). The molecular weights and boiling points of such alkanoates are as follows:

| Name | Molecular Weight | Boiling Point, °C |
|---|---|---|
| Methyl formate | 60 | 31.5 |
| Ethyl formate | 74 | 54 |
| Methyl acetate | 74 | 57.3 |

These alkanoates are more efficient than conventional fluorocarbon blowing agents (i.e., a greater amount of gas is produced per pound of the alkanoate). The greater efficiency of the alkanoates is due to their low molecular weight. Under ideal conditions, the volume of gas produced by a liquid is governed by the Ideal Gas Law and is inversely proportional to the molecular weight of the liquid (i.e., a liquid having a low molecular weight will produce a greater volume of gas than the same weight of a liquid having a higher molecular weight).

A commonly used conventional fluorocarbon blowing agent is trichloromonofluoromethane. The molecular weight and boiling point of the latter blowing agent and other commercial fluorocarbon blowing agents are shown below:

| Name | Molecular Weight | Boiling Point, °C |
|---|---|---|
| Trichloromonofluoromethane | 137 | 23.8 |
| Dichlorodifluoromethane | 121 | 129.8 |
| Monochlorodifluoromethane | 87 | −40.8 |
| Trichlorotrifluoroethane | 187 | 47.6 |
| Dichlorotetrafluoroethane | 171 | 3.6 |
| Mixture: 73.8 wt-% Dichlorodifluoromethane 26.2 wt-% 1,1-difluoroethane | 99* | −33.3 |

*Average

The molecular weights of the above fluorocarbon blowing agents are higher than the molecular weights of the alkyl alkanoate blowing agents employed in the process of the present invention. However, the theoretical efficiency of the alkanoates based on the difference in molecular weights is generally not achieved, presumably because the blowing agents do not follow the Ideal Gas Law exactly. By way of illustration, the theoretical efficiency difference between methyl formate and trichloromonofluoromethane is 23% whereas in practice the observed efficiency difference between these two blowing agents is about 15%.

In a preferred embodiment of the present invention, the blowing agent component comprises both the alkyl alkanoate and a conventional fluorocarbon blowing agent as described above. That is, the blowing agent component comprises from 5 to 50 parts by weight of an alkyl alkanoate and from 95 to 50 parts by weight of a fluorocarbon having a molecular weight from 87 to 187 per 100 parts by weight of the alkanoate and the fluorocarbon. Such preferred blowing agent components have the advantage of the greater efficiency provided by the alkanoate and the lower toxicity provided by the fluorocarbon.

In a particularly preferred embodiment of the present invention, the blowing agent component is an azeotrope composed of 18 parts by weight of methyl formate and 82 parts by weight trichloromonofluoromethane per 100 parts by weight of these two blowing agents. Such azeotropes have the additional advantage of remaining constant in composition and not "fractionating." Other blowing agent mixtures can vary in composition and concentration throughout the foam owing to the unequal rates of volatilization and escape from the foam of the components of such mixtures. The result of such fractionation can be non-uniform density throughout the foam with consequent non-uniformity in other properties.

In the process of the present invention, water is generally used as an additional blowing agent.

If desired, additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as flame retardants, fillers, dyes, pigments, anti-scorch agents and the like.

The components employed in the process of this invention can consist of one or more than one material. That is, one or more polyols, one or more organic polyisocyanates, one or more catalysts, one or more polyurethane foam stabilizers and one or more blowing agents can be employed.

This invention also provides blends comprising a major amount of a polyether polyol or a polyester polyol having a hydroxyl number from 28 to 150 and a minor amount of an alkyl alkanoate having a molecular weight no greater than 74. In a preferred embodiment, this invention provides blends comprising a major amount of a polyether polyol or a polyester polyol having a hydroxyl number from 28 to 150 and a minor amount of a mixture consisting of 5 to 50 parts by weight of an alkyl alkanoate having a molecular weight no greater than 74 and from 95 to 50 parts by weight of a fluorocarbon having a molecular weight of from 87 to 187 per 100 parts by weight of the alkanoate and the fluorocarbon. In a particularly preferred embodiment, this invention provides a blend comprising a major amount of a polyether polyol or a polyester polyol having a hydroxyl number from 28 to 150 and a minor amount of an azeotropic mixture consisting of 18 parts by weight of methyl formate and 82 parts by weight of trichloromonofluoromethane per 100 parts by weight of the methyl formate and trichloromonofluoromethane. The above blends are useful in the process of this invention.

The process of this invention may be performed in accordance with any of the techniques known to the art such as, in particular, the "one-shot" technique. In accordance with this technique, foamed products are provided by carrying out the reaction of the polyisocyanate and polyol components simultaneously with the foaming operation.

The relative amounts of the various components used in the process of this invention are not narrowly critical. The polyol and polyisocyante components are present in the foam-producing formulation in a major amount. The relative amounts of these two components is the amount required to produce the polyurethane structure of the foam and such relative amounts are well known in the art. The blowing agents, catalysts, and foam stabilizers are each present in a minor amount necessary to achieve the function of the component. Thus, the blowing agent is present in an amount sufficient to foam the reaction mixture, the catalyst is present in a catalytic amount (i.e., an amount sufficient to catalyze the reaction to produce the polyurethane at a reasonable rate), and the foam stabilizers are present in a foam-stabilizing amount, that is, in an amount sufficient to stabilize the foam. Similarly any additive is present in the amount required to be effective.

The process of the present invention is suited to the production of "slabstock" polyurethane foams. Slabstock is polyurethane foam produced under conditions such that the foam is free to rise due to the volatilization of the blowing agent (i.e., the foam is produced at atmospheric pressure). Such foams are usually produced by metering separate streams, each containing one or more of the components, into the mixing head of a foam machine. The reaction mixture (foam formulation) is formed in the mixing head and continuously discharged onto a moving sheet where the foaming and curing reactions occur under an atmospheric temperature and pressure.

The polyurethane foams produced in accordance with the present invention are useful in the same areas as conventional flexible slabstock polyurethane foams. Thus, the foams of the present invention can be with advantage in the manufacture of textile interliners, cushions, mattresses, paddings, carpet underlay and the like.

The following Examples illustrate the present invention.

| | Abbreviations |
|---|---|
| | In the Examples, the following abbreviations are used: |
| BA | Blowing Agent |
| cfm | cubic feet per minute |
| conc. | concentration |
| dens. | density |
| fpm. | feet per minute |
| gms. | grams |
| in. | inch |
| lbs. | pounds |
| min. | minute |
| parts | parts by weight/100 parts by wt. of polyol |
| pbw | parts by weight |
| pcf | pounds per cubic foot |
| pph | parts per hundred parts of polyether polyol on a weight basis |
| RPM | revolutions per minute |
| secs. | seconds |
| sq. | square |
| vol. | volume |
| wt. | weight |

Starting Materials

In the following Examples, the starting materials described below were used:

a. Polyether

Polyether P. A polyether polyol which is obtained when glycerol is reacted, in sequence, with propylene oxide, ethylene oxide and propylene oxide using approximately 0.25 weight percent KOH as a catalyst. This polyol has an approximate molecular weight of 3700, a hydroxyl number ranging from 45.8 to 48.8 and contains approximately 0 to 5 percent primary hydroxyl groups. The average composition is:

$CH_2O(CH.CH_3CH_2O)_a (CH_2CH_2O)_b (CH.CH_3CH_2O)_cH$ $CHO(CH.CH_3CH_2O)_d (CH_2CH_2O)_e (CH.CH_3CH_2O)_fH$ $CH_2O(CH.CH_3CH_2O)_g (CH_2CH_2O)_h (CH.CH_3CH_2O)_iH$ where $a$, $d$, and $g$ are each equal to 7.8, where $b$, $e$, and $h$ are each equal to 3.6 and where $c$, $f$, and $i$ are each equal to 9.0.

b. Isocyanate

Isocyanate X. A mixture of 80 wt-% 2,4-toluene diisocyanate and 20 wt-% 2,6-toluene diisocyanate.

c. Catalysts

Catalyst L. This catalyst is a mixture of (i) 70 weight percent bis(2-dimethylaminoethyl)ether, $(CH_3)_2NCH_2CH_2OCH_2CH_2N(CH_3)_2$, and (ii) 30 weight percent dipropylene glycol, $[CH_3CH(OH)CH_2]_2O$.

Catalyst M. A mixture of 1 part by weight of triethyleneamine viz

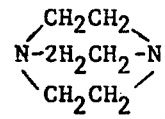

and 2 parts by weight of dipropylene glycol, viz $[CH_3CH(OH)CH_2]_2O$. This catalyst is sold as DABC 33LV.

d. Polyurethane Foam Stabilizers (Surfactants)

Surfactant S. A mixture of: 55 wt-% of a block copolymer having the formula

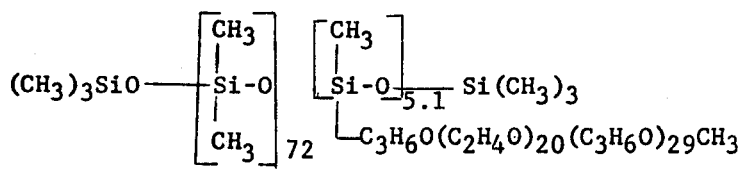

and 45 wt-% of an admixture of: $C_4H_9O(C_2H_4O)_{10.5}(C_3H_6O)_{8.0}H$ (90 wt-%) and $C_9H_{19}C_6H_4O[C_2H_4O]_{10.5}H$ (10 wt-%)

Surfactant V. Same ingredients as Surfactant S but containing 75 wt-% of the block copolymer and 25 wt-% of the admixture.

e. Blowing Agents

Blowing Agent A. Trichloromonofluoromethane.

Blowing Agent B. An azeotropic mixture of 18 parts by weight of methyl formate and 82 parts by weight of Blowing Agent A per 100 parts by weight of the Blowing Agent.

Blowing Agent C. A mixture of 15 parts by weight of ethyl chloride and 85 parts by weight of Blowing Agent A per 100 parts by weight of the Blowing Agent.

| | Glossary of Terms |
|---|---|
| | The terms appearing below have the indicated meanings: |
| Cream Time | The time elapsed from when the foaming mixture is poured into the box (see Example 1) until it turns whiter and begins to expand. |
| Rise Time | The time elapsed from when the foaming mixture is poured into the box until it has completely expanded. |
| Top Collapse | The difference in distance between the maximum initial height of foam rise and the foam rise at "equilibrium", i.e. at the time foam contracts to its permanent height. |
| Foam Rise | The height of foam rise at equilibrium. |
| Foam Density | The weight of foam per unit volume expressed in pounds of foam per cubic foot. |
| Breathability | The openness of the foam cell structure as measured by air flow in cubic feet per minute through a 2" × 2" × 1" piece of foam using the "Nopco Air Flow Apparatus". |
| Hydroxyl Number | Defined above. |

Test Procedures

Unless otherwise indicated, the test procedures that were used in evaluating the physical properties of the polurethane foams produced as described in the Examples appearing below are as follow:

| | |
|---|---|
| Compressive Strength | ASTM D 1621 |
| Foam Dimensional Stability to Cold Aging | ASTM D 2126B |
| Foam Dimensional Stability to Heat Aging | ASTM D 2126E |
| Foam Dimensional Stability to Humid Aging | ASTM D 2126F |
| K Factor (thermal conductivity) | ASTM C 518 |
| Breathability | Nopco Air Flow Apparatus |
| Tensile Strength and Elongation | ASTM D-1564T |
| Tear Strength | ASTM D-1564G |
| Indentation Load Deflection | ASTM D-1564A |
| Compression Set | ASTM D-1564B |

EXAMPLE I

The effect of Blowing Agent B and Blowing Agent C on flexible polyurethane foam properties (compared to Blowing Agent A) is shown in Table I below. The foams were made as follows: A charge of 350 gms. of Polyether P, 10.5 gms. of water, 0.175 gms. of Catalyst L, 0.525 gms of Catalyst M, 3.5 gms of Surfactant S and 70 grams of Blowing Agent A were placed in a one quart paper cup. This mixture was then stirred for 15 seconds with a paddle type stainless steel impeller, 2 inches in diameter, spinning at 2000 RPM. A concentration of 0.25 pph stannous octoate was added and the mixing continued for 8 more seconds. Then, 133 gms. of Isocyanate X was added, and the mixing continued for 7 more seconds. At this point, the mixture was poured into a 12 × 12 × 12 inch cardboard box and the reactivity profile of the foam obtained by measuring its cream time, rise time, top collapse and foam rise. The resultant polyurethane foam was then post cured for 5 minutes at 250°F. After the post cure, the foam was characterized by measuring its density, breathability and cells per linear inch. This procedure was repeated using 52.5 gms. of Blowing Agents B or C in place of the 70 gms. of Blowing Agent A. It was found that equivalent foams were obtained when 52.5 gms. of Blowing Agents B or C were used in comparison to 70 gms. of Blowing Agent A. The procedure was repeated again at a stannous octoate concentrations of 0.30 pph, 0.35 pph, and 0.40 pph for all three Blowing Agents in the amounts indicated above. These series of foams demonstrated that Blowing Agents B and C were both more efficient than Blowing Agent A in that Blowing Agents A, B and C produced foams of equivalent densities even though a larger amount of Blowing Agent A was used.

EXAMPLE II

The effect of Blowing Agent B on flexible polyurethane foam properties compared to Blowing Agent A is shown in Table II below. These foams were prepared on a laboratory scale using the technique described in Example I. This Example shows the effect of changing blowing agent and stannous octoate concentrations on foam rise, foam density and foam breathability. This series of experiments again demonstrates that Blowing Agent B is more efficient than Blowing Agent A in that foams of equivalent densities were prepared using lesser amounts of Blowing Agent B. The efficiency difference can be illustrated as shown by Table III below which is obtained from the foam density and blowing agent concentration data in Table II. Table III shows that an improvement of 6.5 to 9.5 percent was realized using Blowing Agent B rather than Blowing Agent A.

TABLE I

| Blowing Agent | A | | | |
|---|---|---|---|---|
| Blowing Agent Conc., gms | 70 | | | |
| Stannous Octoate Conc., pph* | 0.25 | 0.30 | 0.35 | 0.40 |
| Cream Time, secs. | 11 | 11 | 10 | 9 |
| Rise Time, secs. | 184 | 174 | 150 | 150 |
| Top Collapse, inches | 0.15 | 0.15 | 0.05 | 0.00 |
| Foam Rise, inches | 8.9 | 9.1 | 9.3 | 9.4 |
| Foam Density, pcf. | 1.12 | 1.12 | 1.09 | 1.13 |
| Foam Breathability, cfm | 4.5 | 3.6 | 2.3 | 0.6 |
| Number of Cells per Linear Inch | 36 | 36 | 36 | 36 |
| Blowing Agent | B | | | |
| Blowing Agent Conc., gms | 52.5 | | | |
| Stannous Octoate Conc., pph | 0.25 | 0.30 | 0.35 | 0.40 |
| Cream Time, secs. | 11 | 10 | 10 | 9 |
| Rise Time, secs. | 170 | 157 | 150 | 140 |
| Top Collapse, inches | 0.15 | 0.15 | 0.05 | 0.00 |
| Foam Rise, inches | 8.8 | 8.9 | 9.0 | 9.1 |
| Foam Density, pcf. | 1.13 | 1.14 | 1.17 | 1.24 |
| Foam Breathability, cfm | 4.0 | 3.5 | 2.2 | 1.05 |
| Number of Cells per Linear Inch | 36 | 36 | 36 | 36 |
| Blowing Agent | C | | | |
| Blowing Agent Conc., gms | 52.5 | | | |
| Stannous Octoate Conc., pph | 0.25 | 0.30 | 0.35 | 0.40 |
| Cream Time, secs. | 11 | 10 | 10 | 9 |
| Rise Time secs. | 169 | 156 | 150 | 140 |
| Top Collapse, inches | 0.15 | 0.10 | 0.05 | 0.00 |
| Foam Rise, inches | 8.9 | 8.6 | 9.0 | 9.1 |
| Foam Density, pcf. | 1.17 | 1.16 | 1.20 | 1.15 |
| Foam Breathability, cfm | 4.0 | 3.3 | 1.95 | 0.7 |
| Number of Cells per Linear Inch | 36 | 36 | 36 | 36 |

*"pph" denotes parts by weight per 100 parts by weight of the polyol

In this Example, the following foam formulation (reaction mixture) and mixing conditions were used:

Foam Formulation:

|  | pph | pbw |
|---|---|---|
| Component 1 | | |
| Polyether P | 100.00 | 350.000 |

Foam Formulation:

|  | pph | pbw |
|---|---|---|
| Distilled Water | 3.00 | 10.500 |
| Catalyst L | 0.05 | 0.175 |
| Catalyst M | 0.15 | 0.525 |
| Silicone Surfactant S | 1.00 | 3.500 |
| Blowing Agent | Varied | Varied |
| Component 2 | | |
| Stannous Octoate | Varied | Varied |
| Component 3 | | |
| Isocyanate X (5% excess) | 38.00 | 133.000 |

Mixing Conditions:

| | |
|---|---|
| Mixer Speed, RPM | 2000 |
| Component Mixing Sequence | 1, 2, 3 (see foam formulation) |
| Mixing Time sec. | 15/8/7 (after addition of each component) |
| Temperature °F. | 78 |
| Relative Humidity % | 75 |
| Foam Box Size (inches) | 12 × 12 × 12 |

TABLE II

| Blowing Agent | A | | |
|---|---|---|---|
| BA Conc. pph | | 10.0 | |
| Stannous Octoate pph | 0.25 | 0.30 | 0.35 |
| Foam Rise inches | 7.3 | 7.5 | 7.7 |
| Foam Density pcf | 1.36 | 1.38 | 1.37 |
| Foam Breathability cfm | 3.50 | 1.75 | 0.85 |
| BA Conc. pph | | 17.5 | |
| Stannous Octoate pph | 0.30 | 0.35 | 0.40 |
| Foam Rise inches | 8.8 | 8.9 | 9.1 |
| Foam Density pcf | 1.15 | 1.16 | 1.15 |
| Foam Breathability cfm | 3.00 | 2.50 | 0.85 |
| BA Conc. pph | | 25.0 | |
| Stannous Octoate pph | 0.35 | 0.40 | 0.45 |
| Foam Rise inches | 9.9 | 10.0 | 10.4 |
| Foam Density pcf | 1.02 | 1.02 | 1.01 |
| Foam Breathability cfm | 4.00 | 1.90 | 0.70 |
| Blowing Agent | B | | |
| BA Conc. pph | | 8.0 | |
| Stannous Octoate pph | 0.25 | 0.30 | 0.35 |
| Foam Rise inches | 6.8 | 7.0 | 7.2 |
| Foam Density pcf | 1.46 | 1.44 | 1.44 |
| Foam Breathability cfm | 2.9 | 2.4 | 1.0 |
| BA Conc. pph | | 14.0 | |
| Stannous Octoate pph | 0.30 | 0.35 | 0.40 |
| Foam Rise inches | 8.4 | 8.4 | 8.4 |
| Foam Density pcf | 1.19 | 1.22 | 1.22 |
| Foam Breathability cfm | 3.50 | 2.30 | 0.90 |
| BA Conc. pph | | 20.0 | |
| Stannous Octoate pph | 0.35 | 0.40 | 0.45 |
| Foam Rise inches | 9.6 | 10.0 | 10.1 |
| Foam Density pcf | 1.08 | 1.06 | 1.07 |
| Foam Breathability cfm | 4.20 | 3.00 | 1.50 |

TABLE III

| FOAM DENS. pcf | Blowing Agent A CONC. pph | Blowing Agent B CONC. pph | INCREASED EFFICACY percent |
|---|---|---|---|
| 1.00 | 26.25 | 23.75 | 9.5 |
| 1.05 | 22.87 | 21.00 | 8.2 |
| 1.10 | 20.12 | 18.62 | 7.5 |
| 1.15 | 17.75 | 15.37 | 7.0 |
| 1.20 | 15.50 | 14.37 | 7.3 |
| 1.25 | 13.50 | 12.62 | 6.5 |
| 1.30 | 11.87 | 11.00 | 7.4 |
| 1.35 | 10.50 | 9.75 | 7.1 |
| 1.40 | 9.37 | 7.75 | 6.7 |

EXAMPLE III

The effect of Blowing Agent B on flexible polyurethane foam properties compared to Blowing Agent A using a mixing machine is shown in Table V below. The foam formulation and machine mixing conditions are described by Table IV below. Using a conventional procedure, the streams shown in Table IV were introduced into the mixing head of the mixing machine. The data in Table VI was obtained from the data in Table V and shows that Blowing Agent B is from 14.3 to 16.8 percent more efficient than Blowing Agent A. The data in Table V shows that Blowing Agent B has more of a tendency to soften the foam [note the generally lower ILD values for the foams made with Blowing Agent B] and increase tensile and tear strengths.

TABLE IV

Foam Formulation:

| | | pph | Typical Throughput gms |
|---|---|---|---|
| Stream 1 | Polyether P | 100.00 | 17,200 |
| | Distilled Water | 3.00 | |
| Stream 2 | Catalyst L | 0.05 | |
| | Catalyst M | 0.15 | 596 |
| | Silicone Surfactant S | 0.30 | |
| Stream 3 | Silicone Surfactant S | 0.70 | 120 |
| Stream 4 | Stannous Octoate* | Varied | 100 |
| | Polyether P* | | |
| Stream 5 | Blowing Agent | Varied | 1,720 |
| Stream 6 | Isocyanate X (105 Index) | 38.00 | 6,560 |

*weight ratio of 1:1

Mixing Conditions:

| | |
|---|---|
| Mixer Speed RPM | 5000 |
| Machine Throughput lbs./min. | 58 |
| Mixer Rotor | Standard Flat Blade |
| Mixer Cylinder | 60 MM Bore–4 Baffles |
| Nozzle Diameter inches | 1 |
| Head Pressure | None |
| Stream Temperature | Ambient |
| Traverse Speed fpm | 86 |
| Traverse Distance inches | 24 |
| Conveyor Speed fpm | 8–13 |
| Conveyor Angle degrees | 3.5 |
| Bun Width inches | 36 |
| Bun Height inches | 10–20 |

TABLE V

| | | | | | | |
|---|---|---|---|---|---|---|
| Parts Blowing Agent A | 10 | — | 10 | — | 10 | — |
| Parts Blowing Agent B | — | 8 | — | 8 | — | 8 |
| Parts Stannous Octoate | 0.19 | 0.23 | 0.24 | 0.30 | 0.29 | 0.35 |
| Density pcf | 1.37 | 1.41 | 1.40 | 1.41 | 1.37 | 1.38 |
| Breathability cfm | 4.1 | 3.2 | 2.5 | 2.8 | 1.2 | 2.3 |
| Tensile Strength psi | 11.10 | 11.59 | 12.21 | 12.41 | 13.27 | 13.08 |
| Tear Strength psi | 2.20 | 1.90 | 1.20 | 2.25 | 2.55 | 2.75 |
| Elongation | 296 | 333 | 323 | 319 | 363 | 411 |
| ILD | | | | | | |
| 25% | 20.6 | 20.9 | 24.9 | 21.9 | 21.0 | 20.1 |
| 65% | 35.5 | 36.0 | 43.4 | 36.9 | 36.0 | 34.0 |
| 50 sq. in. Return Value % | 67.0 | 67.0 | 68.3 | 66.1 | 66.7 | 59.9 |
| Load Ratio | 1.7 | 1.7 | 1.7 | 1.7 | 1.7 | 1.7 |

TABLE V – Continued

| | | | | | | |
|---|---|---|---|---|---|---|
| ILD Loss after Humid Aging, % | 23.9 | 21.8 | 20.8 | 20.2 | 25.4 | 24.2 |
| Compression Set 50% | 4.6 | 4.1 | 5.1 | 4.6 | 5.4 | 6.1 |
| 90% | 6.5 | 5.1 | 11.1 | 5.5 | 15.2 | 15.4 |
| | | | | | | |
| Parts Blowing Agent A | 17.5 | — | 17.5 | — | 17.5 | — |
| Parts Blowing Agent B | — | 14 | — | 14 | — | 14 |
| Parts Stannous Octoate | 0.25 | 0.30 | 0.30 | 0.35 | 0.33 | 0.40 |
| Density pcf | 1.26 | 1.21 | 1.12 | 1.17 | 1.07 | 1.16 |
| Breathability cfm | 2.7 | 4.1 | 2.6 | 2.7 | 1.2 | 1.4 |
| Tensile Strength psi | 8.70 | 10.01 | 7.95 | 10.29 | 8.93 | 11.27 |
| Tear Strength psi | 1.30 | 1.40 | 1.05 | 1.90 | 1.25 | 2.20 |
| Elongation | 237 | 361 | 199 | 349 | 217 | 352 |
| ILD | | | | | | |
| 25% | 17.3 | 14.9 | 19.7 | 15.8 | 19.0 | 16.8 |
| 65% | 29.5 | 25.0 | 32.8 | 26.4 | 31.3 | 27.9 |
| 50 sq. in. Return Value % | 68.8 | 66.5 | 65.0 | 64.6 | 63.7 | 63.1 |
| Load Ratio | 1.7 | 1.7 | 1.7 | 1.7 | 1.7 | 1.7 |
| ILD Loss after Humid Aging, % | 20.3 | 23.6 | 22.9 | 27.6 | 22.4 | 23.5 |
| Compression Set 50% | 4.7 | 7.4 | 4.6 | 7.0 | 5.7 | 8.9 |
| 90% | 5.7 | 15.4 | 5.9 | 18.7 | 18.0 | 21.2 |
| | | | | | | |
| Parts Blowing Agent A | 25 | — | 25 | — | 25 | — |
| Parts Blowing Agent B | — | 20 | — | 20 | — | 20 |
| Parts Stannous Octoate | 0.30 | 0.33 | 0.35 | 0.40 | 0.40 | 0.47 |
| Density pcf | 0.99 | 1.01 | 0.99 | 1.02 | 0.98 | 1.00 |
| Breathability cfm | 4.4 | 4.4 | 2.7 | 2.8 | 0.7 | 1.1 |
| Tensile Strength psi | 7.56 | 7.72 | 7.91 | 8.09 | 8.22 | 9.08 |
| Tear Strength psi | 1.55 | 1.50 | 1.85 | 1.55 | 1.90 | 1.70 |
| Elongation | 311 | 374 | 335 | 333 | 295 | 379 |
| ILD | | | | | | |
| 25% | 11.3 | 11.0 | 11.8 | 12.6 | 13.7 | 13.0 |
| 65% | 19.6 | 18.0 | 20.3 | 21.0 | 22.3 | 21.6 |
| 50 sq. in. Return Value % | 67.2 | 65.5 | 67.0 | 62.7 | 62.0 | 63.9 |
| Load Ratio | 1.7 | 1.6 | 1.7 | 1.7 | 1.6 | 1.7 |
| ILD Loss after Humid Aging, % | 25.3 | 24.9 | 26.3 | 24.4 | 25.8 | 23.8 |
| Compression Set 50% | 7.6 | 8.9 | 8.1 | 7.2 | 11.5 | 14.3 |
| 90% | 13.8 | 26.2 | 37.3 | 29.2 | 51.0 | 64.7 |

TABLE VI

| FOAM DENS. pcf | Blowing Agent A CONC. pph | Blowing Agent B CONC. pph | INCREASED EFFICACY percent |
|---|---|---|---|
| 1.00 | 24.50 | 20.37 | 16.8 |
| 1.05 | 22.12 | 18.50 | 15.8 |
| 1.10 | 19.50 | 16.75 | 15.2 |
| 1.15 | 17.50 | 15.00 | 14.3 |
| 1.20 | 15.50 | 13.37 | 14.5 |
| 1.25 | 13.75 | 11.75 | 14.5 |
| 1.30 | 12.12 | 10.37 | 14.4 |
| 1.35 | 10.75 | 9.12 | 16.3 |
| 1.40 | 9.62 | 8.00 | 16.0 |

EXAMPLE IV

Using the procedure described in Example I, five polyurethane foams were produced employing different relative amounts of two blowing agents. The foam formulations used are shown in Table VII and the properties of the polyurethane foams are shown in Table VIII. The data in Table VIII indicates that satisfactory foams were produced in all cases.

TABLE VII

FOAM FORMULATION

| Component | pph | pbw |
|---|---|---|
| 1  Polyether P | 100.00 | 350.00 |
|    Water | 3.00 | 10.50 |
|    Catalyst L | 0.05 | 0.175 |
|    Catalyst M | 0.15 | 0.525 |
|    Surfactant V | 1.00 | 3.5 |
|    Blowing Agent A | Varied | Varied |
|    Methyl Formate | Varied | Varied |
| 2  Stannous Octoate | 0.4 | 1.4 |
| 3  Isocyanate X | 38 | 133 |

MIXING CONDITIONS

| | |
|---|---|
| Mixer Speed, RPM | 2000 |
| Mixing Sequence | 1/2/3 |
| Mixing Time, seconds | 15/8/7 |
| Foam Box Size, inches | 12 × 12 × 12 |

TABLE VIII

THE EFFECT OF METHYL FORMATE ON FLEXIBLE POLYURETHANE FOAM EXPANSION

| Foam Number | 1 | 2 | 3 | 4 | 5 |
|---|---|---|---|---|---|
| Blowing Agent A pph | 17.0 | 7.5 | 4.7 | 2.5 | 0.0 |
| Methyl Formate Conc. pph | 0.0 | 4.2 | 5.5 | 6.4 | 7.2 |
| Blowing Agent Ratio | — | 64/36 | 46/54 | 28/72 | — |
| Cream Time, seconds | 15 | 17 | 18 | 18 | 20 |
| Rise Time, seconds | 104 | 134 | 134 | 135 | 139 |
| Top Collapse, inches | 0.0 | 0.0 | 0.0 | 0.0 | 0.0 |
| Foam Height, inches | 8.5 | 8.3 | 8.2 | 8.2 | 8.0 |
| Foam Appearance | no splits | no splits | * | no splits | ** |
| Cells per Inch | 30–35 | 30–35 | 30–35 | 30–35 | 30–35 |
| Breathability, cfm | 0.8 | 3.0 | 2.8 | 2.3 | 3.2 |
| Density, pcf | 1.26 | 1.34 | 1.35 | 1.43 | 1.38 |

*small split near top and side
**small split near bottom and side

It is preferred that the reaction mixtures employed in the process of the present invention contain of from 10 to 30 parts by weight of the alkyl alkanoate or alkyl alkanoate-fluorocarbon mixture per 100 parts by weight of the polyol component. Any water present in the reaction mixture is preferably present in an amount no greater than 3.5 parts by weight per 100 parts by weight of the polyol component.

What is claimed is:

1. A process for producing flexible polyurethane foams which comprises reacting and foaming, at atmospheric pressure, a reaction mixture comprising:
   a. a polyether or polyester polyol component having a hydroxyl number from 28 to 150,
   b. an organic polyisocyanate component,
   c. a catalyst component for the reaction of (a) and (b) to form the polyurethane,
   d. a polyurethane foam stabilizer component, and
   e. a blowing agent component containing an alkyl alkanoate having a molecular weight no greater than 74, said alkyl alkanoate being selected from the group consisting of methyl formate, ethyl formate and methyl acetate.

2. A process as claimed in claim 1 wherein the blowing agent component comprises from 5 to 50 parts by weight of the alkyl alkanoate and from 95 to 50 parts by weight of a fluorocarbon having a molecular weight from 87 to 187, said parts by weight being based on 100 parts by weight of the alkanoate and the fluorocarbon.

3. A process as claimed in claim 2 wherein the blowing agent component also contains water.

4. A process as claimed in claim 2 wherein the blowing agent component comprises an azeotrope composed of 18 parts by weight of methyl formate and 82 parts by weight of trichloromonofluoromethane per 100 parts by weight of the methyl formate and trichloromonofluoromethane.

5. A process a claimed in claim 4 wherein the blowing agent component also contains water.

6. A blend comprising a major amount of a polyether polyol or a polyester polyol and a minor amount of an alkyl alkanoate having a molecular weight no greater than 74.

7. A blend as claimed in claim 6 comprising a major amount of a polyether polyol or a polyester polyol and a minor amount of a mixture consisting of 5 to 50 parts by weight of an alkyl alkanoate having a molecular weight no greater than 74 and from 95 to 50 parts by weight of a fluorocarbon having a molecular weight of from 87 to 187.

8. A blend as claimed in claim 7 wherein the mixture consists of 18 parts by weight of methyl formate and 82 parts by weight of trichloromonofluoromethane per 100 parts by weight of the methyl formate and trichloromonofluoromethane.

9. A process as claimed in claim 2 wherein the blowing agent component is present in an amount of from 10 to 30 parts by weight per 100 parts by weight of the polyol component.

10. A process for producing flexible polyurethane foams which comprises reacting and foaming, at atmospheric pressure, a reaction mixture comprising:
    a. a polyether or polyester polyol component having a hydroxyl number from 28 to 150,
    b. an organic polyisocyanate component,
    c. a catalyst component for the reaction of (a) and (b) to form the polyurethane,
    d. a polyurethane foam stabilizer component, and
    e. a blowing agent comprising a mixture of 18 parts by weight of methyl formate and 82 parts by weight of trichloromonofluoromethane per 100 parts by weight of the methyl formate and trichloromonofluoromethane.

* * * * *

UNITED STATES PATENT OFFICE
CERTIFICATE OF CORRECTION

Patent No. 3,879,315  Dated  April 22, 1975

Inventor(s)  J. Watkinson & R. R. Elrick

It is certified that error appears in the above-identified patent and that said Letters Patent are hereby corrected as shown below:

In the heading, change the last name of the second inventor from "Elrich" to "Elrick".

Signed and Sealed this sixteenth Day of September 1975

[SEAL]

Attest:

RUTH C. MASON
*Attesting Officer*

C. MARSHALL DANN
*Commissioner of Patents and Trademarks*